United States Patent
Tanaka et al.

(10) Patent No.: US 10,656,022 B2
(45) Date of Patent: May 19, 2020

(54) TEMPERATURE SENSOR

(71) Applicant: Yazaki Corporation, Tokyo (JP)

(72) Inventors: Hiraku Tanaka, Makinohara (JP);
Akinori Sakamoto, Makinohara (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 189 days.

(21) Appl. No.: 15/946,292

(22) Filed: Apr. 5, 2018

(65) Prior Publication Data

US 2018/0364108 A1   Dec. 20, 2018

(30) Foreign Application Priority Data

Jun. 20, 2017   (JP) ................. 2017-120309

(51) Int. Cl.
| | | |
|---|---|---|
| *G01K 1/00* | (2006.01) | |
| *G01K 7/00* | (2006.01) | |
| *G01K 1/14* | (2006.01) | |
| *G01K 1/16* | (2006.01) | |
| *G01K 7/22* | (2006.01) | |
| *B60L 58/24* | (2019.01) | |

(52) U.S. Cl.
CPC ............... *G01K 1/14* (2013.01); *B60L 58/24* (2019.02); *G01K 1/143* (2013.01); *G01K 1/16* (2013.01); *G01K 7/22* (2013.01); *B60L 2240/545* (2013.01); *G01K 2205/00* (2013.01)

(58) Field of Classification Search
USPC ........................ 374/208, 141, 163
See application file for complete search history.

(56) References Cited

U.S. PATENT DOCUMENTS

| | | | |
|---|---|---|---|
| 6,257,758 B1 * | 7/2001 | Culbertson | ............ G01K 1/143 |
| | | | 374/120 |
| 2017/0370781 A1 * | 12/2017 | Yoshihara | ............... G01K 1/143 |
| 2018/0274985 A1 * | 9/2018 | Tanaka | ................... G01K 1/143 |

FOREIGN PATENT DOCUMENTS

| | | |
|---|---|---|
| JP | 61219841 A | 9/1986 |
| JP | 2001221693 A | 8/2001 |
| JP | 2011-017638 A | 1/2011 |

* cited by examiner

Primary Examiner — Mirellys Jagan
(74) Attorney, Agent, or Firm — Sughrue Mion, PLLC (57) ABSTRACT

The present invention provide a temperature sensor including a sensor main body having a contact surface for contacting with the upper surface of a battery cell, a mounting member holding the sensor main body and attaching it to the battery cell, and a coil spring arranged between the sensor main body and the mounting member. When viewing from an opposite side to the contact surface, the center P1 of the contact surface coincides with the center P2 of a trajectory connecting a pressing point pressed by the coil spring. When the mounting member is inclined due to inclination of a resin member mounted on the upper surface of the battery, the temperature sensor can absorb all inclinations by the coil spring, and prevent the contact surface away from the upper surface of the battery cell.

16 Claims, 7 Drawing Sheets

TEMPERATURE SENSOR

The present invention relates to a temperature sensor used for detecting temperature for example a cell in-vehicle battery.

BACKGROUND OF THE INVENTION

Conventionally, a battery mounted on a hybrid vehicle or electric vehicle and the like is configured by connecting a plurality of battery cells in series in order to obtain high voltage. In such battery, a temperature sensor is attached on the battery cell and temperature is monitored so as to suppress overcharge or over discharge.

Figure 9:
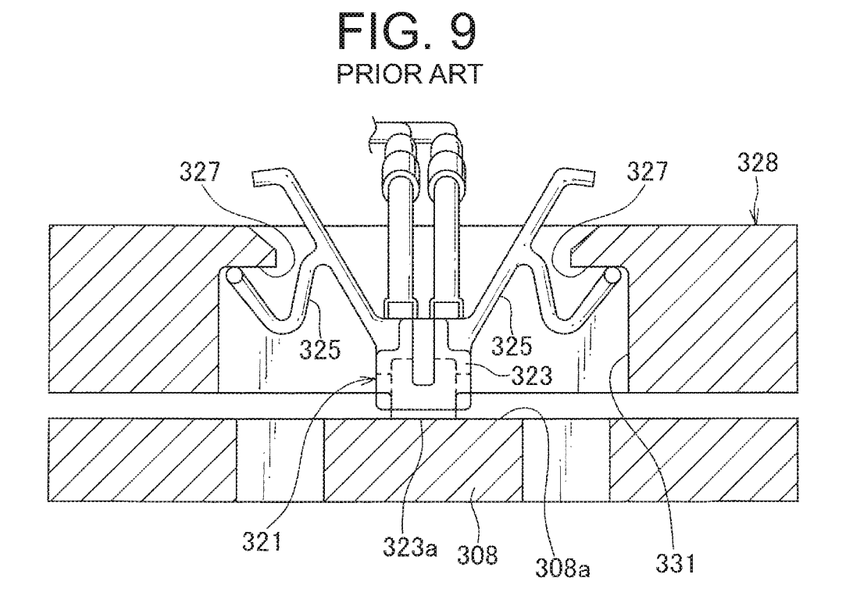
FIG. 9 is a cross-sectional view showing a state that the conventional temperature sensor is attached to the temperature sensing portion.

As the above mentioned temperature sensor, for example, in the Patent Literature 1, it is disclosed. As shown in FIG. 9, the temperature sensor 321 has a sensor main body 323 covering the periphery of thermistor with resin, and a pair of locking arms 325 extending toward both sides of the sensor main body 323.

In the tip of the sensor main body 323, a flat temperature measuring surface 323a abutting on an upper surface 308a of a battery cell 308 being a portion to be measured is arranged.

In the locking arm 325, a tip portion thereof is locked on a sensor locking portion 327 of a module part 328 fixed on a side of the upper surface 308a of the battery cell 308.

The sensor locking portion 327 is provided such that an upper end opening of a sensor receiving hole 331 formed in the module part 328 is narrowed, and presses the tip portion of the locking arm 325 toward a battery cell 308 side.

The temperature sensor 321 is attached on the battery in a state that the tip portion of the locking arm 325 receives a pressing load for the upper surface 308a side of the battery cell by the sensor locking portion 327. Further, contact condition between the temperature measuring surface 323a and the upper surface 308a of the battery cell 308 is ensured by elastic restoring force of the locking arm 325.

Patent Literature 1: JP 2011-17638 A

SUMMARY OF THE INVENTION

The above module part 328 may be inclined with respect to the upper surface 308a of the battery cell 308 due to installation tolerance or the like. In order to accurately measure temperature of the battery cell 308, even if an inclination is caused on the module part 328, it is necessary to absorb the inclination by the temperature sensor 321, and maintain the contact condition between the temperature measuring surface 323a and the upper surface 308a of the battery cell 308.

However, the conventional temperature sensor 321 is able to absorb the inclination in a deflection direction of the locking arm 325 (horizontal direction in plane of paper of FIG. 9), but it is difficult to absorb the inclination in a perpendicular direction to the deflection direction (direction vertical to a plane of paper of FIG. 9). When the inclination of the module part 328 is not able to be absorbed by the temperature sensor 321, the temperature measuring surface 323a is arranged away from the upper surface 308a of the battery cell 308, thereby there is a problem such that it is difficult to accurately measure temperature.

Accordingly, an object of the present invention is to provide a temperature sensor which can prevent the contact surface from being away from a temperature sensing portion.

In order to solve the object, the temperature sensor of the present invention has a sensor main body having a contact surface for contacting with a temperature sensing portion; a mounting member for holding the sensor main body from an opposite side to the contact surface and attaching the sensor main body to the temperature sensing portion; and an elastic member arranged between the sensor main body and the mounting member and pressing the sensor main body from the opposite side to the contact surface. A center of the contact surface is positioned within an area of a trajectory connecting a pressing point pressed by the elastic member when viewing from the opposite side to the contact surface.

According to the present invention, when the mounting member is inclined, a direction and range of the inclination which is able to be absorbed by the elastic member is increased. Thus, it is possible to prevent the contact surface away from the temperature sensing portion.

DESCRIPTION OF THE PREFERRED EMBODIMENT

Figure 1:
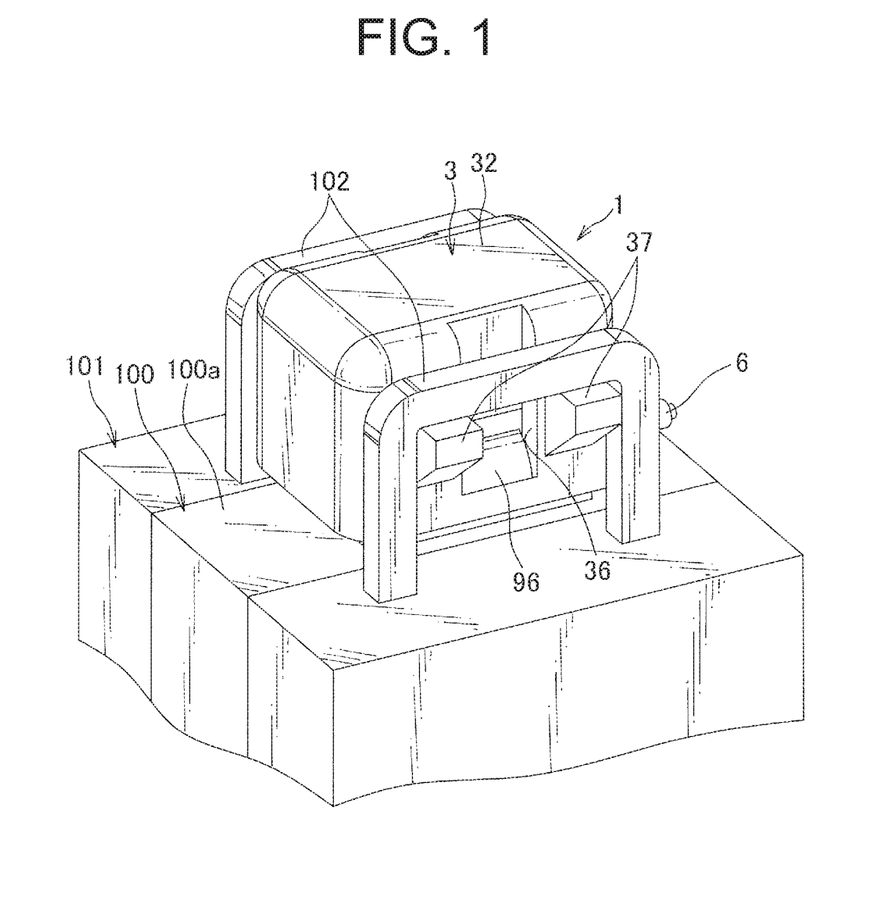
FIG. 1 is a schematic perspective view showing a state that a temperature sensor is attached to a temperature sensing portion according to one embodiment of the present invention.

A temperature sensor according to one embodiment of the present invention will be explained with reference to FIGS. 1 to 7. A temperature sensor 1 shown in FIG. 1 is used for detecting temperature of a cell 100 of a battery mounted on a hybrid vehicle or electric vehicle, and arranged on an upper surface 100a (corresponding to a temperature sensing portion) of the cell 100. Further, a resin member 101 is attached to the upper surface of the battery. In the resin member 101, a pair of locking frames 102 is arranged so as to attach the temperature sensor 1 to the upper surface 100a of the cell 100.

Figure 2:
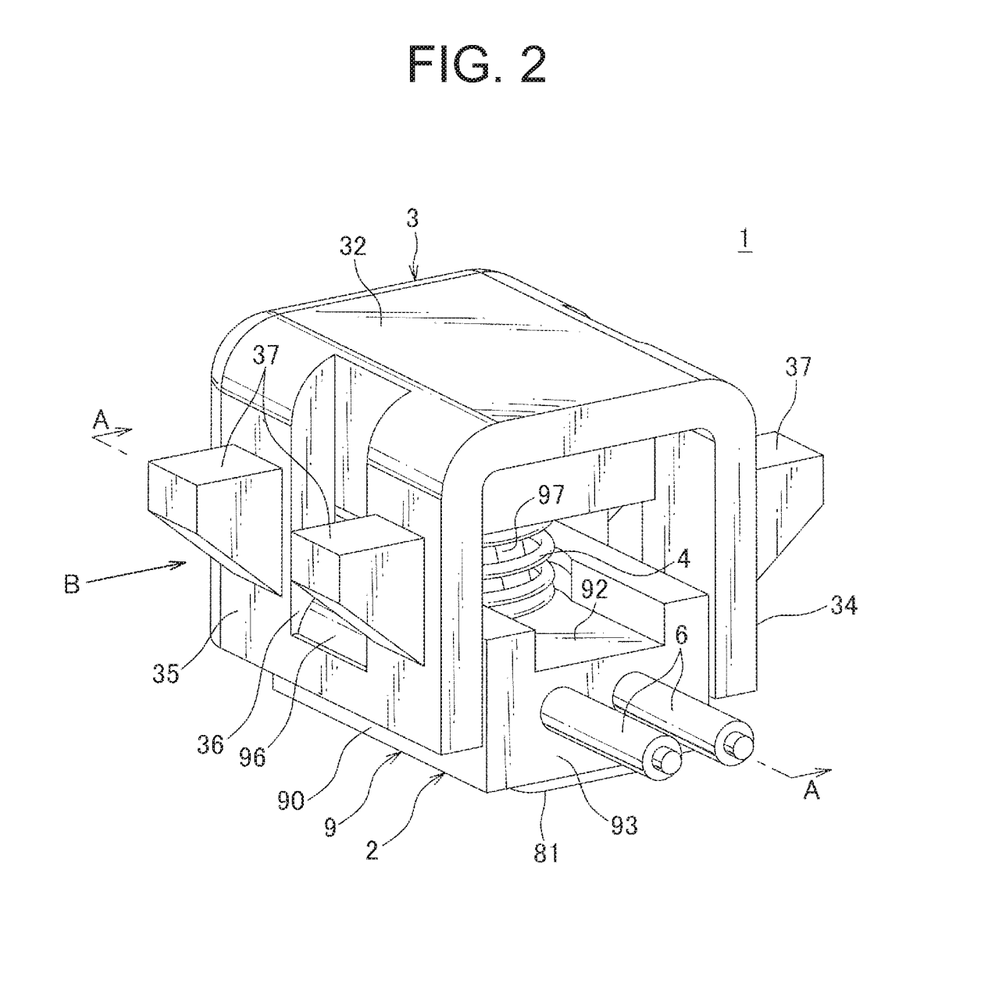
FIG. 2 is a schematic perspective view of the temperature sensor in FIG. 1.
Figure 3:
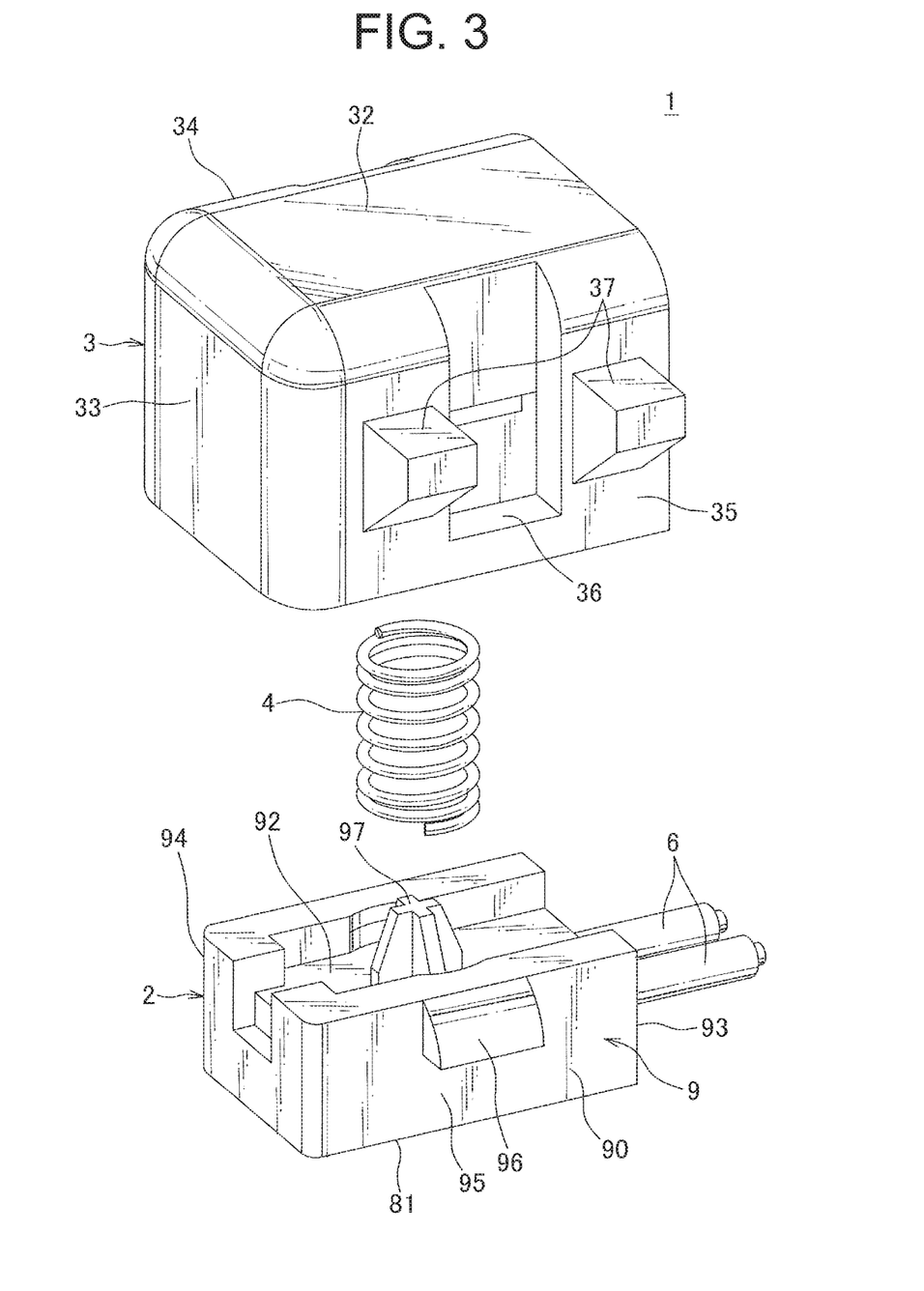
FIG. 3 is an exploded view of the temperate sensor in FIG. 1.

As shown in FIGS. 2 and 3, the temperature sensor 1 has a sensor main body 2 overlapped on the upper surface 100a of the cell 100, a mounting member 3 for holding the sensor main body 2 and attaching the sensor main body 2 to the upper surface 100a of the cell 100, and a coil spring 4 as "elastic member" located between the sensor main body 2 and the mounting member 3. The sensor main body 2, the mounting member 3, and the coil spring 4 are separately formed, then assembled, and thereby the temperature sensor 1 is constructed.

Figure 4:
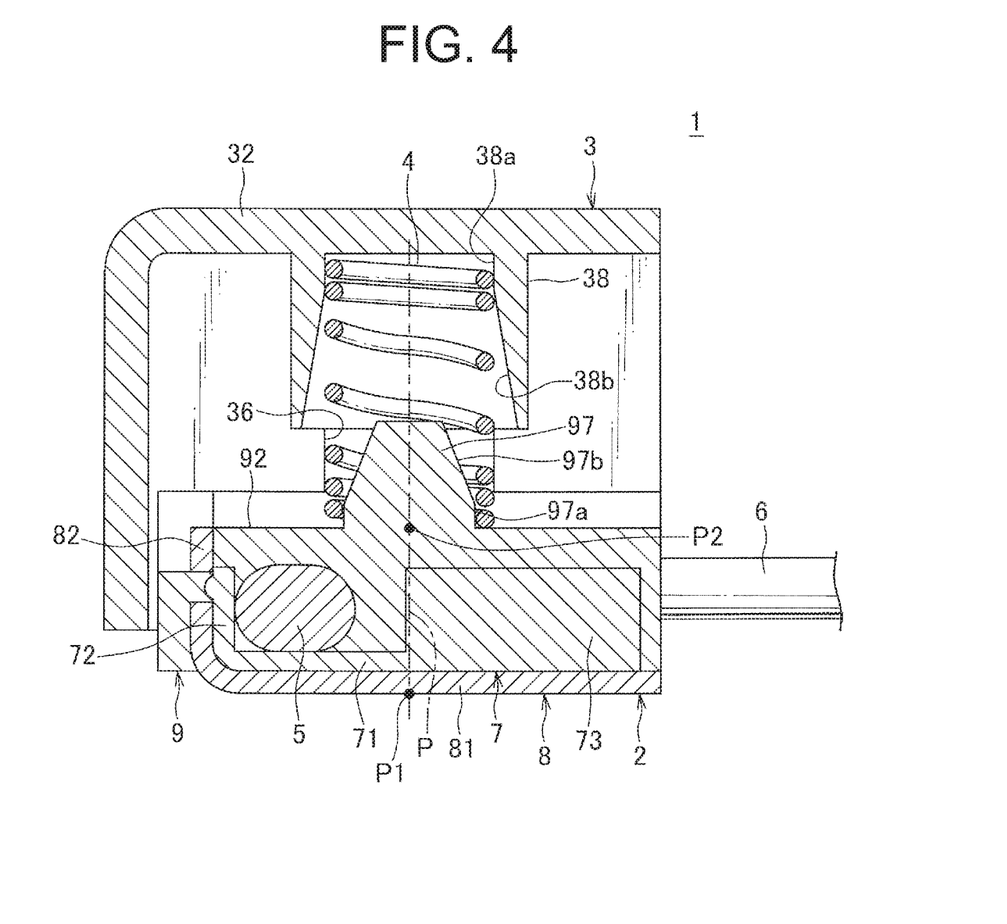
FIG. 4 is a cross-sectional view taken along the line A-A in FIG. 2.
Figure 5:
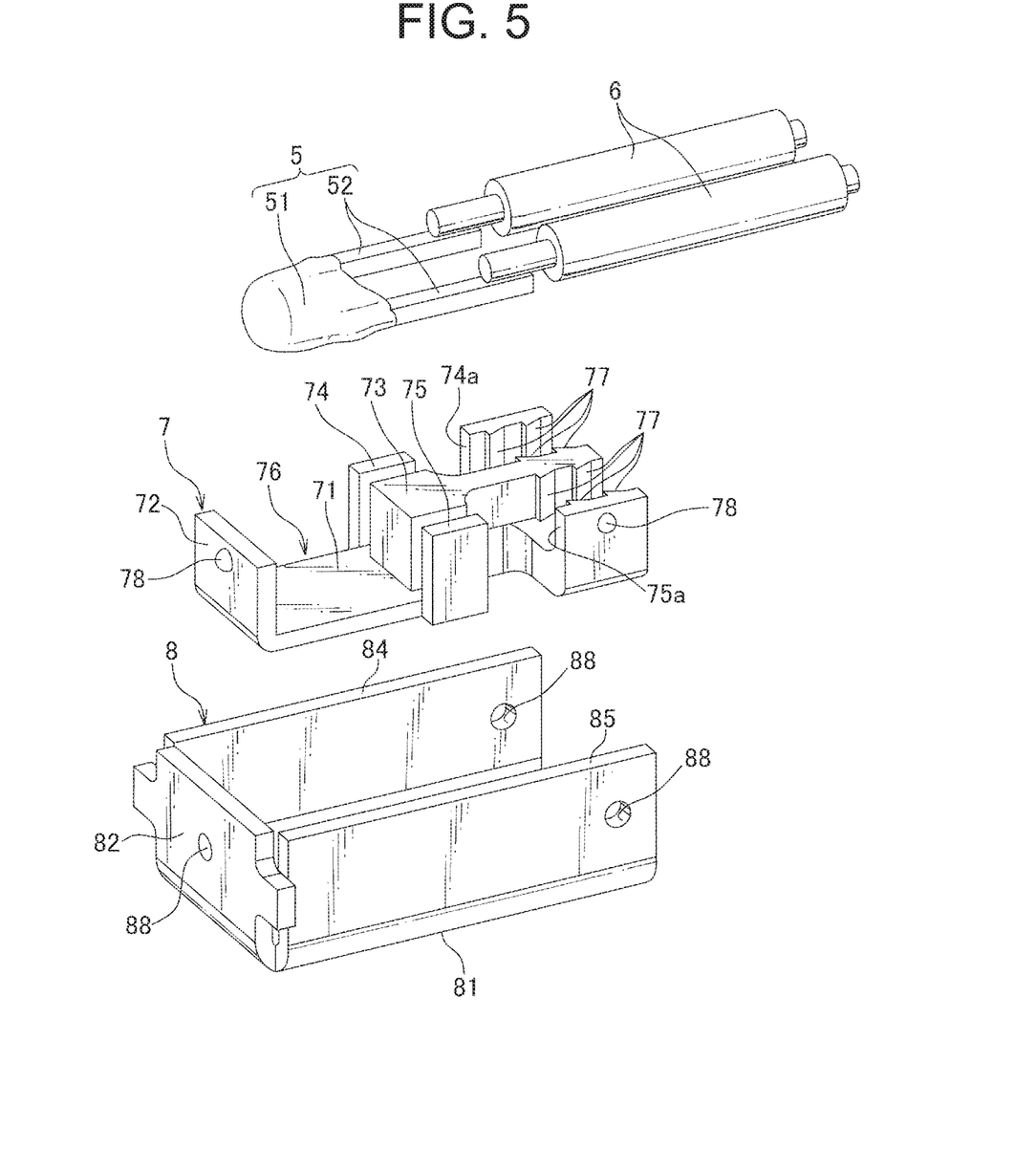
FIG. 5 is an exploded view of the sensor main bod in FIG. 3.

As shown in FIGS. 4 and 5, the sensor main body 2 has a thermistor 5, a pair of electric wires 6 electrically connected to the thermistor 5, a heat collecting plate 8 made of metallic, a regulating member 7 arranged between the thermistor 5 and the heat collecting plate 8, and a holding portion 9 holding them.

The thermistor 5 has an element portion 51, and a pair of lead portions 52 protruding from the element portion 51. The pair of lead portions 52 are jointed to core wires of a pair of electric wires 6 by soldering, respectively.

The heat collecting plate 8 is obtained by pressing a metal plate. The heat collecting plate 8 has a rectangular plate bottom wall 81, a side wall 82 vertically standing from a short side of the bottom wall 81, and side walls 84, 85 vertically standing from long sides opposed to each other in the bottom wall 81. The bottom wall 81 comes into contact with the upper surface 100a of the cell 100a. Hereafter, the bottom wall 81 is referred to as a contact surface 81 (Accurately, the lower surface of the bottom wall 81 is the contact surface). In the side walls 82, 84 and 85, through holes 88 are respectively provided.

The regulating member 7 is to prevent contact with the thermistor 5 and the heat collecting plate 8 or the electric wire 6 and the heat collecting plate 8, and is made of insulating synthetic resin. The regulating member 7 has a rectangular plate bottom wall 71, a side wall 72 vertically standing from a short side of the bottom wall 71, side walls 74 and 75 vertically standing from long sides opposed to each other in the bottom wall 71, and a standing portion 73 vertically standing from the bottom wall 71 and positioned between the side walls 74 and 75.

The side wall 72 is not connected to the side walls 74 and 75. In other words, both ends of the side wall 72 and each of ends of the side walls 74 and 75 are arranged with intervals. Further, in the side walls 74 and 75, cutouts 74a and 75a are formed. Furthermore, in side walls 72, 74 and 75, hemisphere bosses 78 engaged to the through holes 88 of the heat collecting hole 88 described above.

Figure 6:
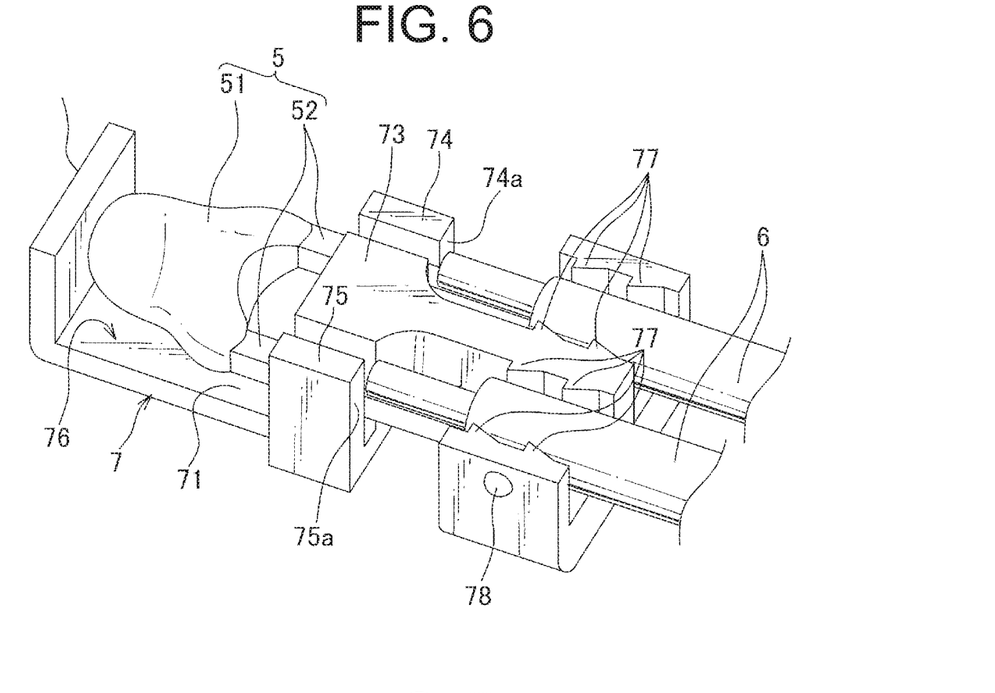
FIG. 6 is a view showing a state that a thermistor of FIG. 5 and an end portion of an electric wire is received into a regulating member.

The side wall 72 and the standing portion 73 are arranged with an interval. As shown in FIG. 6, the element portion 51 is located between the side wall 72 and the standing portion 73.

The side wall 74 and the standing portion 73 are arranged with an interval. As shown in FIG. 6, one of the pair of lead portions 52 and one of the ends of the electric wire 6 are located between the side wall 74 and the standing portion 73. In each of opposed surfaces of the side wall 74 and the standing portion 73, a projection 77 for preventing position gap of the electric wire 6 is provided.

The side wall 75 and the standing portion 73 are arranged with an interval. As shown in FIG. 6, the other of the pair of lead portions 52 and the other of the ends of the electric wire 6 are located between the side wall 75 and the standing portion 73. In each of opposed surfaces of the side wall 75 and the standing portion 73, a projection 77 for preventing position gap of the electric wire is provided.

The above portion between the side wall 72 and the standing portion 73, a portion between the side wall 74 and the standing portion 73, and a portion between the side wall 75 and the standing portion 73 are collectively referred to as "a receiving portion 76". As such that, in the regulating member 7, the receiving portion 76 is provided so as to receive the thermistor 5 and the end of the electric wire 6 electrically connected to the thermistor 5 and position them.

The regulating member 7 is fitted between the side walls 84 and 85 of the heat collecting plate 8 such that the bottom wall 71 is overlapped with the upper surface of the bottom wall 81, the side wall 72 is overlapped with the side wall 82, the side wall 74 is overlapped with the side wall 84, and the side wall 75 is overlapped with the side wall 85. Then, the regulating member 7 is assembled in the heat collecting plate 8 by engaging each of the bosses 78 with each of the through holes 88 corresponding to the bosses.

The holding portion 9 is made of insulating synthetic resin. As shown in FIG. 3, the holding portion 9 has a rectangular holding main body 90, a locking projection 96 arranged on two side surfaces 94 and 95 opposed to each other in the holding main body 90 and locked in a locking hole 36 of the mounting member 3 described below, and a convex portion 97 arranged on the upper surface 92 of the holding main body 90.

When injection molding the holding portion 9 by using a die, the thermistor 5, the pair of electric wires 6, the regulating member 7 and the heat collecting plate 8 are inserted into the die, and thereby they are integrated with the holding portion 9. As shown in FIGS. 3 and 4, the thermistor 5, the ends of the pair of electric wires 6 and the regulating member 7 are buried in the holding main body 90. Each of the pair of electric wires 6 is guided from one side surface 93 of the holding main body 90 toward an outside of the holding main body 90. In the heat collecting plate 8, the side walls 82, 84 and 85 are buried in the holding main body 90, and the contact surface 81 is exposed at a bottom portion of the holding main body 90. Further, the pair of lead portions 52 in the thermistor 5 is located parallel to the contact surface 81 of the heat collecting plate 8.

As shown in FIG. 4, the convex portion 97 is a part for holding the coil spring 4 which is arranged in an inside of the coil spring 4. The convex portion 97 has a base portion 97a which vertically extending from the upper surface 92 of the holding main body 90 in a height direction of the holding main body 90, and a tip portion 97b which is tapered with increasing distance from the base portion 97a.

Such convex portion 97 retractably holds the coil spring 4 together with a spring holding portion 38 of the mounting member 3 described below. Moreover, in the convex portion 97, the base portion 97a controls position gap in a radial direction of one end of the coil spring 4 (position gap in a planer direction of the upper surface 92), and the tip portion 97b allows displacement of the middle portion of the coil spring 4 in the radial direction.

The mounting member 3 is made of insulating synthetic resin. As shown in FIGS. 3 and 4, the mounting member 3 has a rectangular plate ceiling wall 32, a side wall 33 extending from a short side of the ceiling wall 32 downward, and side walls 34 and 35 extending from long sides opposed to each other in the ceiling wall 32 downward. Further, the mounting member 3 is formed with a cover shape so as to cover the sensor main body 2 and the coil spring 4. In addition, the mounting member 3 has locking holes 36 arranged on the side walls 34 and 35, lock portions 37 arranged in the side walls 34 and 35, and a spring holding portion 38 arranged in the ceiling wall 32.

The locking hole 36 is a through hole in which the locking projection 96 of the sensor main body 2 described above is engaged. The locking hole 36 is formed larger than the locking projection 96, and thereby the locking projection 96 is able to be freely inclined within the locking hole 36.

As shown in FIG. 2, a pair of the locking portions 37 is provided at both sides of the locking hole 36 in the side walls 34 and 35. As shown in FIG. 1, the locking portions 37 is locked in the locking frame 102 of the resin member 101 attached to the upper surface of the battery. As a result, the temperature sensor 1 is attached to the upper surface 100a of the cell 100.

The spring holding portion 38 is a part for holding the coil spring 4 which is arranged on the outer periphery of the coil spring 4, and extends in cylindrical shape downward from the ceiling wall 32 as shown in FIG. 4. The spring holding portion 38 has a base portion 38a extending from the ceiling wall 32, and an enlarged diameter portion 38b continuing to the base portion 38a. An inner diameter in the base portion 38a is constant, and an inner diameter in the enlarged diameter portion 38b is formed to be gradually larger as going away from the base portion 38a.

Such spring holding portion 38 retractably holds the coil spring 4 together with the convex portion 97 of the sensor main body 2 described above. Further, in the spring holding portion 38, the base portion 38a controls position gap of the other end of the coil spring 4 in the radial direction (position gap of the ceiling wall 32 in the planar direction), and the enlarged diameter portion 38b allows displacement of the middle portion of the coil spring 4 in the radial direction.

In the mounting member 3, the sensor main body 2 is positioned between the side walls 34 and 35 such that the ceiling wall 32 is opposed to the upper surface 92. The mounting member 3 holds the sensor main body 2 by engaging each of the locking projections 96 to each of the locking hole 36 corresponding to the locking projection 96.

The coil spring 4 is formed by winding a linear metal material in spirals. The coil spring 4 is retractably held by the above convex portion 97 and the spring holding portion 38. The coil spring 4 is located between the sensor main body 2 and the mounting member 3 in a compressed state, and presses in a direction distancing the upper surface 92 of the sensor main body 2 from the ceiling wall 32 of the mounting member 3.

Figure 7:
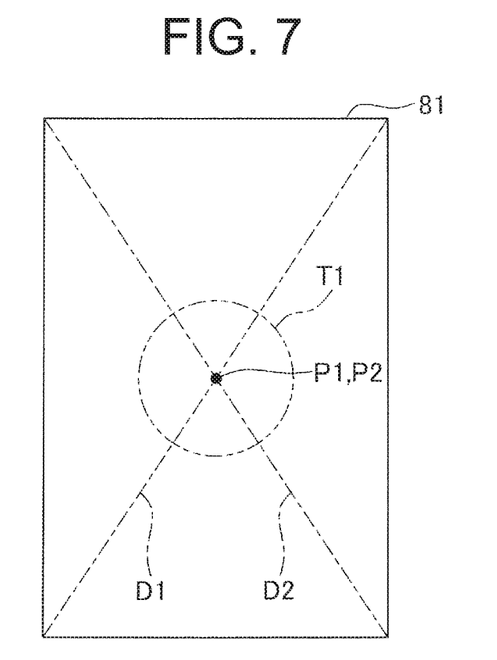
FIG. 7 is an explanatory diagram for explaining the structure of the temperature sensor of FIG. 1.

Further, as shown in FIG. 7, in the temperature sensor 1, a center P1 of the contact surface is located within an area of a trajectory T1 connecting a pressing point pressed by the coil spring 4 from viewing the opposite side to the contact surface. Thereby, uneven contact of the coil spring 4 is prevented. "The center P1 of the contact surface" is an intersection of a diagonal line D1 with a diagonal line D2 in the contact surface 81 shown in FIG. 7. "The trajectory T1" is a circular. Further, in the embodiment of the present invention, the center P1 of the contact surface 81 is consistent with a center P2 of the trajectory T1 from viewing the opposite side to the contact surface.

Furthermore, in a natural state that the temperature sensor 1 is not attached to the upper surface 100a of the cell 100, as shown in FIG. 4, the convex portion 97, the spring holding portion 38 and the coil spring 4 are coaxially arranged, and the axis is consistent with a perpendicular line P passing through the center P1 of the contact surface 81. In addition, the width of the locking hole 36 is substantially the same as the diameter of the coil spring 4. In an arrow B direction vision of FIG. 2, the center of the locking hole 36 in a width direction, the center of the locking projection 96 in the width direction, and the axis of the coil spring 4 are matched.

The temperature sensor 1 is located between the pair of locking frames 102 opposed to each other, and attached to the upper surface 100a of the cell 100 by locking the pair of lock portions 37 at a side wall 34 side in one of the locking frame 102, and locking the pair of lock portions 37 at a side wall 35 side in the other of the locking frame 102.

When the temperature sensor 1 is attached to the upper surface 100a of the cell 100, the mounting member 3 is pressed by the pair of locking frames 102, and thereby the coil spring is bent with the stroke pressed. As a result, the coil spring 4 presses the sensor main body 2 from an upper surface 92 side, and presses the contact surface 81 into the upper surface 100a of the cell 100. In this way, a certain pressure or more is applied to the contact surface 81, and thereby accurate measured temperature can be obtained.

The above resin member 101 may cause inclination for the upper surface 100a of the cell 100 due to installation tolerance or the like. When the mounting member 3 is inclined by inclination of the resin member 101, the temperature sensor 1 having the above structure can absorb inclination in all directions by the coil spring 4, and can prevent the contact surface 81 away from the upper surface 100a of the cell 100. By such that, the temperature of the cell 100 can be accurately measured.

Further, since the coil spring 4 is made of metal, there is no damping of the spring force due to creep like a resin spring.

Figure 8:
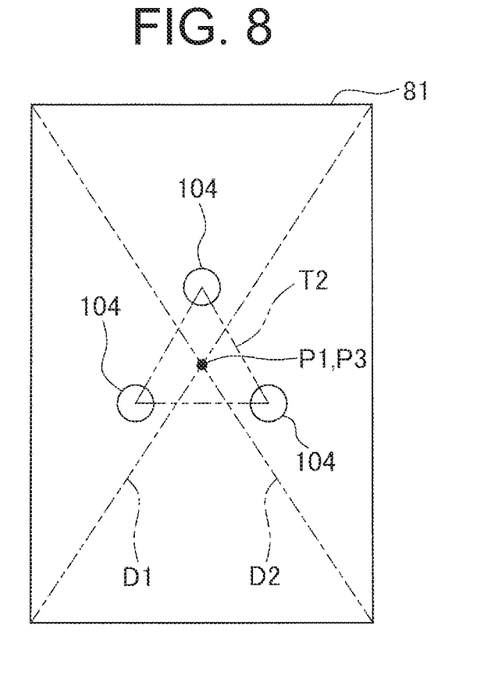
FIG. 8 is an explanatory diagram for explaining another example of the temperature sensor of FIG. 1.

In the embodiment described above, one large coil spring 4 is provided, but instead of it, as shown in FIG. 8, a plurality of small coil springs 4 may be used. In this case, as an example shown in drawing, the center P1 of the contact surface 81 is preferably coincide with the center P3 of the trajectory T2 connecting the pressing point pressed by the plurality of small coil springs 4, however at least the center P1 just has to be positioned within the area of trajectory T2.

Further, in order to constitute "area" with the trajectory connecting the pressing point pressed by the elastic member such as the above coil spring 4 or 104, at least three the pressing points are required. Thus, if there are at least three the pressing points, and the center P1 of the contact surface 81 is located within the area of the trajectory connecting those pressing points, the number of the elastic members may be one or plural. Also, when pressing force is linear like the above embodiment, the line (pressing line) consider as a collection of pressing points.

In the embodiment described above, the coil spring 4 or 104 is used as "elastic member". However, instead of the coil spring 4 or 104, another elastic member such as cylindrical rubber may be used. Further, material of the coil spring 4 or 104 is not limited to metal.

Further, the phrase "center of the contact surface" in the specification means "gravity of the contact surface" when viewing the contact surface in plane. That is, it has no connecting with the actual mass of the sensor main body, the center of gravity of the contact surface as the figure on the assumption that the mass of the sensor main body is uniformly distributed to all regions of the contact surface is "the center of the contact surface" in the specification. Similarly, the phrase "center of the trajectory connecting the pressing point pressed by the elastic member" has no connecting with the mass. Its phase is the center of gravity of the contact surface when the trajectory is viewed as a planner figure.

The above-described embodiments merely indicate representative modes of the invention, and the invention is not restricted to the embodiments. That is, those skilled in the art may variously modify and implement the embodiments within a range not departing from a subject matter of the invention according to conventionally known knowledge. When a configuration of a feeding mechanism of the invention is included according to the modification, the modification falls under the category of the invention.

REFERENCE SIGNS LIST 1 temperature sensor
2 sensor main body 3 mounting member
4 coil spring (elastic member)
81 contact surface
100a upper surface of cell (temperature sensing portion)

The invention claimed is:

1. A temperature sensor comprising:
   a sensor main body having a contact surface for contacting with a temperature sensing portion;
   a mounting member holding the sensor main body from an opposite side to the contact surface and attaching the sensor main body to the temperature sensing portion; and
   an elastic member arranged between the sensor main body and the mounting member and pressing the sensor main body from the opposite side to the contact surface,
   wherein a convex portion arranged on the sensor main body is configured to control a position gap of the elastic member in a radial direction of one end of the elastic member so that a center of the contact surface is positioned within an area of a trajectory connecting a pressing point pressed by the elastic member when viewing from the opposite side to the contact surface.

2. The temperature sensor according to claim 1, the mounting member is a cover shape for covering the sensor main body and the elastic member.

3. The temperature sensor according to claim 1, wherein the mounting member has an elastic member holding portion that is arranged in a cylindrical shape around the elastic member and extends downward from a ceiling wall of the mounting member.

4. The temperature sensor according to claim 1, wherein the convex portion holds the elastic member with a base portion of the convex portion that is vertically extending from the sensor main body towards a ceiling wall of the mounting member and a tip portion of the convex portion which is tapered with increasing distance from the base portion.

5. The temperature sensor according to claim 1, wherein the elastic member is a plurality of coil springs.

6. The temperature sensor according to claim 1, wherein the elastic member is a coil spring, and the trajectory connecting the pressing point pressed by the coil spring is a circular form.

7. The temperature sensor according to claim 6, the mounting member is a cover shape for covering the sensor main body and the elastic member.

8. The temperature sensor according to claim 1, wherein the mounting member has locking holes arranged on a first and a second side wall and the sensor main body has locking projections on a first and second side wall that fit within the locking holes on the mounting member.

9. The temperature sensor according to claim 8, wherein the locking holes on the mounting member are formed larger than the locking projections on the sensor main body.

10. The temperature sensor according to claim 1,
    wherein the sensor main body locks into the mounting member with the elastic member arranged between the mounting member and the sensor main body, and
    wherein the mounting member locks into locking frames on the temperature sensing portion.

11. The temperature sensor according to claim 10,
    wherein the temperature sensing portion is an upper surface of a battery cell.

12. The temperature sensor according to claim 11, wherein locking portions on an exterior of a first and a second side wall of the mounting member lock into the locking frames on the upper surface of the battery cell.

13. The temperature sensor according to claim 1, wherein the center of the contact surface coincides with a center of the trajectory connecting the pressing point pressed by the elastic member.

14. The temperature sensor according to claim 13, the mounting member is a cover shape for covering the sensor main body and the elastic member.

15. The temperature sensor according to claim 13, wherein the elastic member is a coil spring, and the trajectory connecting the pressing point pressed by the coil spring is a circular form.

16. The temperature sensor according to claim 15, the mounting member is a cover shape for covering the sensor main body and the elastic member.

* * * * *